UNITED STATES PATENT OFFICE.

CYRUS FISHER, OF PITTSBURG, PENNSYLVANIA.

INSECTICIDE.

SPECIFICATION forming part of Letters Patent No. 593,089, dated November 2, 1897.

Application filed July 29, 1897. Serial No. 646,316. (No specimens.)

*To all whom it may concern:*

Be it known that I, CYRUS FISHER, a citizen of the United States, residing at Pittsburg, in the county of Allegheny and State of Pennsylvania, have invented certain new and useful Improvements in Compounds for Destroying Insects on Trees, &c.; and I do declare the following to be a full, clear, and exact description of the invention, such as will enable others skilled in the art to which it appertains to make and use the same.

My invention relates to compounds designed to be used for destroying insects upon trees, shrubs, vines, and other plants.

The said compound is composed of the following ingredients in about the proportions specified, to wit: sour milk, five gallons; gasolene, one quart; asafetida, one pound.

The asafetida is dissolved in warm water and the ingredients are then thoroughly mixed and applied to the foliage of the tree, vine, or plant by spraying and to the body of the tree by means of a brush or by spraying.

The gasolene will effectually destroy any insect with which it comes in contact on the tree, and the asafetida will have the effect of repelling any flying or creeping insect from lodging on the tree to which my compound has been applied. The advantage of using milk as a vehicle is that it will adhere to the tree much better than water and will also prevent the gasolene from vaporizing too rapidly. The asafetida will also remain on the foliage in the form of a powder after the compound has dried off.

None of the ingredients injure the foliage or body of the tree in the slightest degree and can therefore be used with perfect safety.

Having described my invention, what I claim, and desire to secure by Letters Patent, is—

The compound for destroying insect life composed of sour milk, gasolene and asafetida, in or about the proportions specified.

In testimony whereof I affix my signature in presence of two witnesses.

CYRUS FISHER.

Witnesses:
 CHARLES DUGAN,
 FRANK MCNICKLE.